United States Patent [19]

Hoekje et al.

[11] 3,864,457

[45] Feb. 4, 1975

[54] PROCESS FOR THE PRODUCTION OF CHLORINE DIOXIDE

[75] Inventors: Howard H. Hoekje, Akron; Cletus N. Welch, Clinton, both of Ohio

[73] Assignee: PPG Industries, Inc., Pittsburgh, Pa.

[22] Filed: Dec. 22, 1972

[21] Appl. No.: 317,569

[52] U.S. Cl.................. 423/480, 423/478, 423/552
[51] Int. Cl...... C01b 11/02, C01d 5/02, C01d 5/00
[58] Field of Search........................... 423/478–480, 423/551, 552

[56] References Cited
UNITED STATES PATENTS

| | | | |
|---|---|---|---|
| 2,373,830 | 4/1945 | Holst.................................. | 423/480 |
| 2,895,801 | 7/1959 | Northgraves et al. .............. | 423/480 |
| 3,347,628 | 10/1967 | Sepall................................. | 423/480 |
| 3,446,584 | 5/1969 | Fuller................................. | 423/480 |

OTHER PUBLICATIONS

Chem. Abstracts, Vol. 70, 1969, page 540.

*Primary Examiner*—Edward Stern
*Attorney, Agent, or Firm*—Roger S. Benjamin

[57] ABSTRACT

Disclosed is an improved process for the production of chlorine dioxide by the reaction of an alkali metal chlorate with sulfur dioxide in an acidic medium containing chloride ions. The improvement involves introducing sulfur dioxide and chlorine to an acidic solution of sodium chlorate containing chloride ions, while maintaining equilibrium conditions in said solution in which the solution is 5.0 to 6.4 normal in sulfuric acid, 0.9 to 1.7 molar in chlorate, and 0.1 to 0.6 molar in chloride.

8 Claims, 1 Drawing Figure

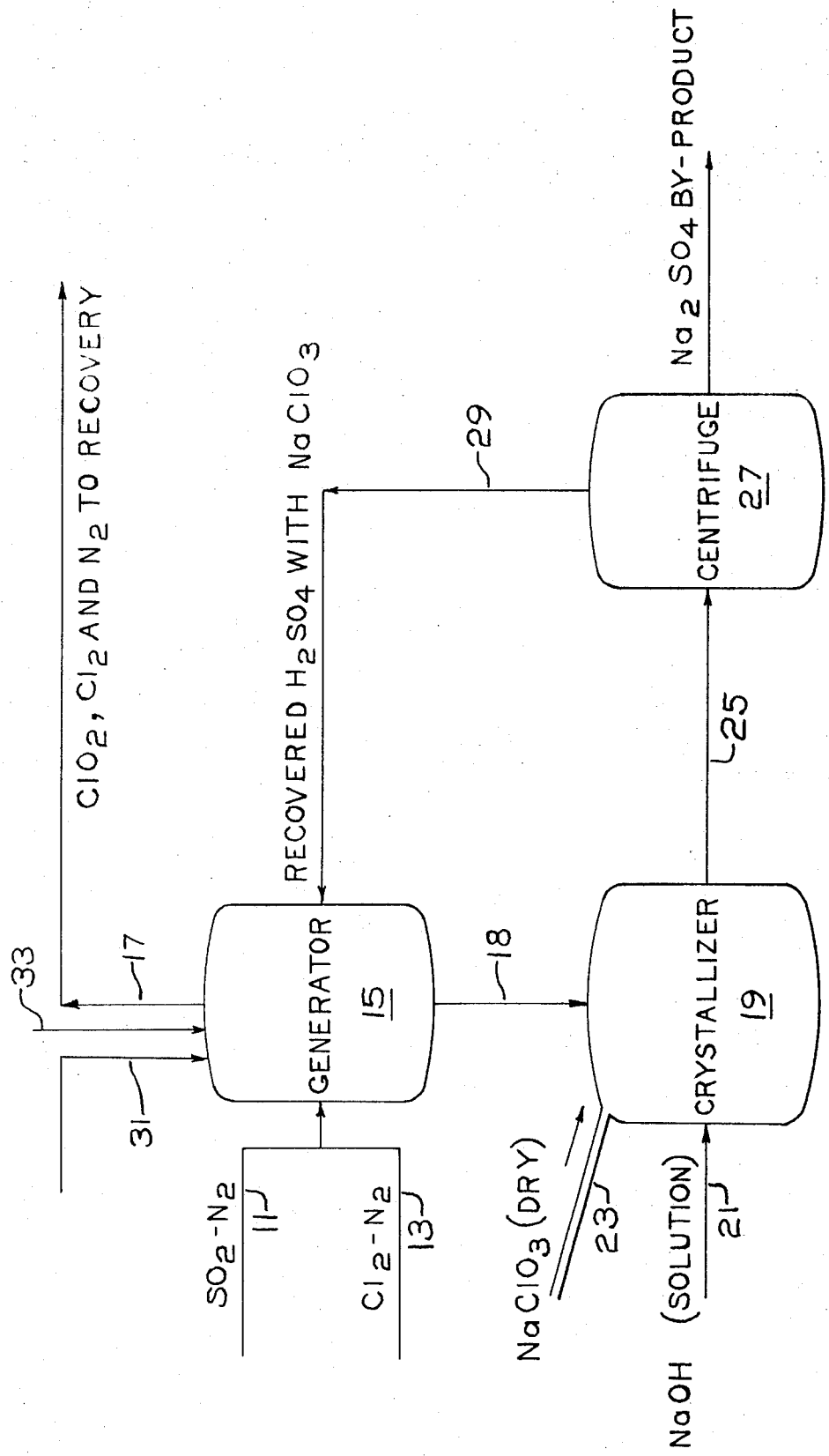

PROCESS FOR THE PRODUCTION OF CHLORINE DIOXIDE

This invention relates to the production of chlorine dioxide. More specifically, the invention relates to a method of producing chlorine dioxide while recovering neutral alkali metal sulfate by operating at a lower acidity than is normally employed. This is accomplished without losing the high efficiencies generally achieved in processes employing high acidities.

There are many commercial methods available for the production of chlorine dioxide by the reduction of an alkali metal chlorate. For example, Sepall et al., disclose in U.S. Pat. No. 3,347,628 a method for producing chlorine dioxide by the reaction of sodium chlorate with hydrochloric acid. Another method is disclosed by Northgraves et al. in U.S. Pat. No. 2,895,801. In most conventional processes, it has been considered necessary to maintain the acidity of the reaction media at about 10N in order to achieve essentially complete reaction of chlorate and thus minimize its loss in the reactor effluent. It is desirable to recover neutral sodium sulfate from the spent reaction liquor since this salt can readily be marketed to kraft mills; however, at acidity levels of around 10N the acid sulfate is formed which is normally sewered resulting in the loss of a potential by-product as well as presenting a pollution problem. Attempts to ensure the recovery of neutral sodium sulfate by lowering the acid concentration of the reaction media have been less than successful due to the decrease in efficiency realized at lower acid levels. It would be desirable to operate a process for the production of chlorine dioxide by the reaction of an alkali metal chlorate and sulfur dioxide at a sufficiently low acid level to provide for the recovery of neutral sodium sulfate while maintaining the efficiency of a high acid process.

The present invention is an improvement in the process for producing chlorine dioxide and sodium sulfate by passing sulfur dioxide and chlorine into an acidic alkali metal chlorate solution containing chloride ions. The improvement comprises introducing sulfur dioxide and chlorine to the solution while maintaining the solution at equilibrium conditions in which the acid concentration is 5.0 to 6.4 N, the chlorate concentration is 0.9 to 1.7 M, and the chloride concentration is 0.1 to 0.6 M.

The process is carried out by preparing the reaction liquor which contains the desired concentration of acid, chlorate, and chloride and introducing a mixture of $SO_2$ and $Cl_2$ into the solution. Normally the gas stream will be diluted with an inert gas such as nitrogen in order to prevent the buildup of an explosive concentration of $ClO_2$ in the product stream. The chlorate concentration is maintained at a level of from 0.9 to 1.7 molar and preferably between 1.1 and 1.3 molar. At chlorate concentrations below 0.9 molar, efficiency of $ClO_2$ production suffers; whereas at concentrations above 1.7 molar, excess chlorate is carried through the system to an undesirable extent. This is the case since the reactor effluent is recycled back to the reactor after recovery of by-product sodium sulfate.

The chlorine dioxide producing reaction is represented by the following equation when sodium chlorate is used as the $ClO_3^-$ source:

1. $2\ NaClO_3 + SO_2 = 2\ ClO_2 + Na_2SO_4$

In addition, the side reactions

2. $2\ NaClO_3 + 5\ SO_2 + 4\ H_2O = Cl_2 + Na_2SO_4 + 4\ H_2SO_4$

3. $NaClO_3 + 3SO_2 + 3\ H_2O = NaCl + 3\ H_2SO_4$ will occur to a certain extent. Chlorine is bubbled through the reaction liquor to suppress reaction (2) and the chloride concentration is maintained at a level of from 0.1 to 0.6 molar to suppress reaction (3). Maintenance of the chloride concentration at 0.1 molar or above minimizes the side reaction which forms chloride at the expense of chlorate. It has also been found that maintenance of the chloride at 0.6 molar or below keeps the formation of excess chlorine at a minimum. At high concentrations of chloride, chlorine is produced at the expense of chlorate as represented by the following equation:

$3\ H_2SO_4 + NaClO_3 + 5\ NaCl = 2\ Cl_2 + 3\ H_2O + 3\ Na_2SO_4$

Chlorine is passed into the reaction liquor along with $SO_2$, typically at a $SO_2$ to $Cl_2$ mole ratio of 5:1, up to 25:1, and normally at a ratio in the range of from 10:1 to 20:1.

Because acid is produced in side reactions (2) and (3), its concentration will increase as the process proceeds and neutralization is required before sodium sulfate can be recovered. Generally, the solution will be neutralized to an acid level of 4.5 normal or below and, preferably, to a level of 4.2 normal to 4.5 normal before sodium sulfate is recovered. The acid concentration is normally not reduced to below 4.2 N since reduction to below this level will necessitate the addition of acid when the liquor is recycled.

Sodium sulfate is recovered by causing its precipitation from the neutralized reaction liquor and separating the precipitated salt from the liquor by liquid-solid separatory means such as centrifugation or filtration. Precipitation of sodium sulfate is preferably accomplished by the addition of sodium chloride. Because of the common sodium ion and lower solubility of sodium sulfate, addition of sodium chlorate will cause its precipitation. Normally sufficient sodium chlorate is added to bring the chlorate concentration back up to a concentration of 3.0 to 3.5 molar. This concentration will insure substantially complete precipitation of $Na_2SO_4$ and serve to fortify the generator in $ClO_3^-$ upon recycle. Sodium chlorate may be added as a solution; however, it is preferably added in the solid form to avoid dilution of the effluent from the reactor. When a sodium chlorate solution is added, excess water may be evaporated in order to bring the acid, chlorate, and chloride concentration up to levels which will not unduly dilute the feed stream upon recycle. After recovery of precipitated sodium sulfate, the reaction liquor is recycled to the generator.

In a preferred embodiment, the concentration of the reaction liquor at equilibrium is maintained in the range of 5.8 to 6.2 normal in acid, 1.1 to 1.3 molar in chlorate, and 0.2 to 0.4 molar in chloride.

Operation of the process in the above-described manner makes it possible to produce chlorine dioxide at high efficiencies while recovering neutral sodium sulfate from the spent reaction liquor.

Due to the reduced acidity of the reaction liquor, the temperature at which the present process is carried out will usually be higher than that at which high acid processes are operated. The temperature will normally be maintained in the range of from 30°C. to 90°C., typically from 40°C. to 60°C., and preferably in the range of from 50°C. to 55°C. The process will normally be carried out at atmospheric pressure although sub-atmospheric and super-atmospheric pressure may be employed.

The method by which the process may be carried out is illustrated by the drawing. Sulfur dioxide and $Cl_2$ each in admixture with nitrogen are fed through lines 11 and 13, respectively, to generator 15 where $SO_2$ and $NaClO_3$ react to form $ClO_2$ and $Na_2SO_4$. The generator effluent gases, $ClO_2$, $Cl_2$, and $N_2$ are fed through line 17 to the recovery chamber (not shown). The generator effluent solution containing $Na_2SO_4$, $H_2SO_4$, and unreacted sodium chlorate is pumped from the generator via line 18 to the crystallizer 19. Sufficient caustic solution is added to neutralize the sulfuric acid produced in the generator through line 21 while dry sodium chlorate is added through opening 23 to precipitate $Na_2SO_4$ from solution. Precipitated $Na_2SO_4$ is recovered in the centrifuge 27. The solution containing $H_2SO_4$ and sodium chlorate is then pumped from the centrifuge back to the generator through line 29 as the recycle solution.

An alternate method is to neutralize with caustic and concentrate the solution by evaporation to precipitate $Na_2SO_4$. After recovering the precipitated $Na_2SO_4$ by filtration, the filtrate is recycled to the generator. The generator is recharged with chlorate by adding a $NaClO_3$ solution through line 31. Addition of this solution will reduce the acidity to too low a level, thus requiring the addition of make-up acid through line 33 in order to bring the acidity up to a level of 4.0 to 4.5 N.

The method by which the present invention may be practiced is further illustrated by the following examples.

EXAMPLE I

A $ClO_2$ generator was prepared from a 24-inch by 68-millimeter glass tube having a capacity of approximately 1,325 milliliters. The generator was equipped with two solution inlets, an effluent overflow tube, a gas outlet, and a quartz immersion heater. Eight 16-inch by 12-millimeter outside diameter draft tubes, four of which were flared at the end to 25 millimeters, were placed at the reactor and supported by a grid. Below the draft tube was placed a sparging tube in such a manner that when gas was bubbled through the tube the bubbles entered the draft tubes and resulted in effective mixing of the generator solution. A mixture of $SO_2$, $Cl_2$, and $N_2$ as diluent was bubbled through the sparging tube after having first been thoroughly mixed.

A feed solution which was 3.18 molar in sodium chlorate, 2.37 molar in sodium sulfate, 0.15 molar in sodium chloride and 4.18 normal in sulfuric acid was fed to the reactor at a rate which provided 6.67 millimoles per minute chlorate while the reactor temperature was maintained at 56°C. The generator solution was allowed to come to equilibrium after which the exhaust gas stream was analyzed as follows:

The gases evolved from the generator were fist swept through a 400-milliliter water scrubber followed by a 350-milliliter, 6.50 molar $NaClO_3$ scrubber, and finally into two 400-milliter, 20 per cent KI scrubbers. The water and $NaClO_3$ scrubbers, which were presaturated with the effluent gas stream before a sample was taken, ensured that no HCl, $SO_2$, or other volatile acids were allowed to enter the KI scrubbers. In operation the KI scrubbers were allowed to collect the reactor effluent gas stream for 15 minutes and the composition of the gas stream with respect to $Cl_2$ and $ClO_2$ determined by titrating first under neutral conditions and then under acid conditions with $Na_2S_2O_3$. The generator effluent solution and feed solution were analyzed for chloride by the Mohr method, acidity by hydroxide neutralization, and $ClO_3^-$ by acidified $NaSaO_2$ and $KBrO_3$.

At equilibrium conditions, the generator liquor was determined to be 1.15 molar in $ClO_3^-$ with a flow rate from the liquid effluent tube of 2.45 millimoles per minute, 0.31 molar in chloride, and 5.85 normal in acid. The generator gas effluent was determined to be 72.1 weight per cent $ClO_2$ with a flow rate of 3.78 millimoles per minute. The concentration of $ClO_2$ in the effluent was rather low due to the presence of a substantial quantity of feed $Cl_2$ in the effluent stream. Efficiency was defined as moles of $ClO_2$ produced to moles of $ClO_3^-$ reacted times 100, i.e., $3.78/(6.67 - 2.46) \times 100 = 89.9$ per cent efficiency.

EXAMPLE II

An experiment was carried out in which a feed solution 7.33 molar in chlorate and 0.53 molar in chloride was fed to the generator at a rate sufficient to provide 6.41 millimoles per minute chlorate. A recycle stream which was 1.15 molar in chlorate, 3.02 molar in sulfate, and 7.62 N in sulfuric acid was fed to the generator in a ratio of 1.92:1 to the first stream. The total $ClO_3^-$ feed rate was 8.34 millimoles per minute. The generator temperature was maintained at 55°C.

At equilibrium the solution in the generator was determined to be 1.20 molar in $ClO_3^-$ with a flow rate of 2.99 millimoles per minute, 0.15 molar in chloride, and 6.12 normal in acid while the generator gas effluent was found to contain 71.0 weight per cent $ClO_2$ and has a $ClO_2$ flow rate of 4.71 millimoles per minute. As in Example I, the concentration of $ClO_2$ in the gas stream was low due to the presence of feed chlorine. Determining efficiency as in Example I, i.e., $(4.71/(8.34 - 2.99) \times 100$, an efficiency of 88 per cent is obtained.

We claim:

1. A process for the generation of chlorine dioxide which comprises
   a. introducing sulfur dioxide and chlorine to an equilibrated, acidic alkali metal chlorate reaction liquor which is 5.0 to 6.4 normal in sulfuric acid, 0.9 to 1.7 molar in chlorate, and contains chloride in a concentration of from 0.1 to 0.6 molar to form chlorine dioxide and alkali metal sulfate;
   b. neutralizing the reaction liquor to an acid level of 4.5 normal or less; and
   c. precipitating and recovering alkali metal sulfate from the reaction liquor.

2. The process of claim 1 wherein the acidic alkali metal chlorate solution of step (a) is 5.8 to 6.2 normal in sulfuric acid, 1.1 to 1.3 molar in chlorate, and 0.2 to 0.4 molar in chloride.

3. The process of claim 1 wherein the alkali metal is sodium.

4. The process of claim 3 wherein the neutralized reaction liquor separated from the alkali metal sulfate of step (c) is recycled to step (a).

5. The process of claim 1 wherein the equilibrated solution is 5.8 to 6.2 normal in sulfuric acid, 1.1 to 1.3 molar in chlorate, and 0.2 to 0.4 molar in chloride.

6. The process of claim 5 wherein the molar ratio of $SO_2$ is $Cl_2$ is in the range of from 5:1 to 25:1.

7. The process of claim 6 wherein the molar ratio of $SO_2$ to $Cl_2$ is in the range from 10:1 to 20:1.

8. The process of claim 1 wherein the alkali metal sulfate is precipitated in step (c) by the addition of alkali metal chlorate.

* * * * *